United States Patent [19]
Cutler et al.

[11] 3,866,027
[45] Feb. 11, 1975

[54] DIGITAL TOOL SIZE COMPENSATION FOR NUMERICAL CONTROL

[75] Inventors: Hymie Cutler, Detroit; Donald Vadasy, Southgate both of Mich.

[73] Assignee: The Bendix Corporation, Southfield, Mich.

[22] Filed: May 9, 1973

[21] Appl. No.: 358,768

[52] U.S. Cl............. 235/151.11, 318/572, 318/632
[51] Int. Cl.............................................. G06f 15/46
[58] Field of Search ....... 235/151.11; 318/572, 632, 318/600, 601

[56] References Cited
UNITED STATES PATENTS

| | | | |
|---|---|---|---|
| 3,500,150 | 3/1970 | Foster | 235/151.11 X |
| 3,555,253 | 1/1971 | Seki | 235/151.11 |
| 3,673,396 | 6/1972 | Seki | 235/151.11 |
| 3,684,874 | 8/1972 | Kelling | 235/151.11 |

OTHER PUBLICATIONS
Kawarada et al., "A Cutter Compensator For Numerical Control Use," Bull. Tokyo Institute of Tech. No. 107, 1971, pp. 89–97.

*Primary Examiner*—Felix D. Gruber
*Assistant Examiner*—Jerry Smith
*Attorney, Agent, or Firm*—James R. Ignatowski; Lester L. Hallacher

[57] ABSTRACT

A closed loop digital system for compensating for changes in tool sizes in a numerically controlled machine having a control containing an On-Line computer is described. The machine is either programmed to include the actual profile of the part to be machined without regard to cutting tool dimensions, or the tool center path is programmed for a particular tool size and the tool size may be changed by the operator. For the purposes of programming, the profile to be machined is divided into segments so that each segment is a continuous path through space. Each of the continuous paths represents one cut of the machine part and is represented by one block of data stored by the memory of the system. The complete profile of the part being machined is achieved by sequentially completing the segments in the order dictated by the desire configuration of the part. Compensation for tool dimensions is accomplished by a closed loop digital offset compensation circuit responsive to the dimension of the tool and the data block indicative of the active segment of the profile program. The digital circuit calculates the tool offset along the coordinate axes of the numerical control machine and enters the offset values into the command counters of the machine's output drive as digital pulses having the same pulse weight as the command pulse generated by the On-Line computer. Tool size compensation is therefore achievable by injecting the tool dimensions into the computer and without any further operations on the part of the machine operator.

21 Claims, 9 Drawing Figures

DIGITAL TOOL SIZE COMPENSATION FOR NUMERICAL CONTROL

BACKGROUND OF THE INVENTION

In numerically controlled equipment, the profile of the part to be machined is defined from a reference point along orthogonal coordinate axes. This definition of the machine part is then programmed into a storage mechanism such as a tape or magnetic storage, which then energizes an On-Line computer during the operation of the numerically controlled machine. The computer readout is a set of digital pulse signals which control the path of the machining tool through appropriate output control elements such as servos or stepping motors.

The cutting tool is held by a support mechanism so that it follows the programmed part profile to accomplish the desired machining of the part. However, the path of the tool is very difficult to define with respect to the cutting edge of the tool, and accordingly the tool path is ordinarily defined by the center of the tool. As an example, if the tool has a circular cutting edge, the path tool is defined by the center point of the circular configuration. Because of this definition of the path of the tool, the profile of the part to be cut is different from the actual path of the tool. As a consequence, in programming the tool path, it is necessary to provide an offset which compensates for the distance between the tool center and the profile of the part to be machined.

In prior art numerical control systems the programmed offset is computed by Off-Line computations at the time of initial programming. As a consequence, when the cutting tool is replaced by a tool having a different radius, it is necessary to offset the travel path of the tool center in order to cause the cutting edge of the tool to follow the desired profile and dimensions of the machined part. In existing systems, the cutter compensation required when changing tool sizes is accomplished by open loop circuits offsetting the axes of the coordinate system instead of by modifying the part program. The axis offset is accomplished by providing on the control panel of the numerically controlled machine, a set of potentiometers or switches so that an offset signal usually in the form of an electrical signal indicative of the tool radius can be input to the computer from which offset signals are generated and provided to the output servos which control the path of the cutting tool.

There are several disadvantages to this system of providing cutter compensation. In numerically controlled machines having tool changers, a separate set of cutter compensation controls and switches must be provided so that the operator can set in the size of the tool each time the machine changes tool bits. This results in an expensive and space consuming array of switches and potentiometers in the control panel of the system.

Another disadvantage stems from the fact that the offset signals in most compensation systems are analog signals, and therefore, contains errors which are proportional to the amount of the offset. This is particularly true where the control signals of the system are digital but the offset signals are analog therefore the analog signals must be converted to digital signals, adding to the inherent error. Furthermore, the analog offset values entered on a potentiometer are not suited to computerized control and a new value must be entered each time the tool is changed. This is not as flexible as a system in which one or more offset values may be stored.

Finally open loop compensation systems are not as stable as closed loop systems.

SUMMARY OF THE INVENTION

The disadvantages of the prior art systems enumerated hereinabove are overcome by the invention in that it provides a digital closed loop system for cutting tool compensation in which more than one offset radius value may be input to the numerical control and stored in digital form. The cutter compensation circuit computes the offset in the form of digital pulses having equal weight to the command pulses generated by the Numerical Control On-Line computer rather than analog voltage compensation of prior art.

In the invention, the desired part profile is programmed into the computer and may include an assumed cutting tool radius, or alternatively, may assume a zero radius and consequently define the actual profile of the machined part. Radii values, the actual radii of one or more tools, or the difference between the assumed tool radius and the actual radii of one or more tools with their appropriate sign, plus if larger or minus if smaller, are digitally inserted into the On-Line computer where they are stored. The program selects the appropriate stored radius value, the sign and the planes in which cutter compensation is to be active and this data along with data indicative of the active segment of the profile program are input into the inventive cutter compensation circuit. The cutter compensation circuit responds to the input data and generates by means of a closed loop circuit digital offset pulses which define the cutter tool compensation with respect to the input radius value in terms of the selected coordinate axes about which the machined part profile is defined. The path of the center of the cutting tool is, therefore, computed from the active segment of the programmed part profile, and the selected radius value. Because the cutter compensation offset is defined with respect to the coordinate axes of the part profile and the radius value of the cutter tool, compensation is effected by the program selecting the appropriate stored radius value which will be used in cutting the part. This eliminates the requirement for the operator to inject into the computer by means of potentiometers and switches, the new radius value each time a new tool is used. Further, because the radii valves are stored digitally, the stored radius value is always the same, and not subject to the operator error associated with resetting the potentiometers.

The compensation circuit combines the cutter radius value with the data from the programmed part profile and computes the travel path of the cutter tool center so that the desired profile and dimensions are achieved. The closed operation of the cutter compensation circuit further serves to increase the stability and accuracy of the computed compensation offset.

Furthermore, because the compensation offset is generated as a set of digital pulses, having the same pulse weight as the command pulses, generated by the On-Line computer, the inventive circuit allows a wider range of offsets to be entered with greater accuracy. The accuracy of the offset compensation is therefore approximately equal to the machine motion corresponding to command pulses.

Further, because the tool offset is calculated normal to the programmed path, the inventive compensation circuit permits the use of canned cycles to shorten part programming. Such canned cycles can operate to call for a portion of a part program to be repeated with a different value of feed-rate, speed, and cutter compensation, but which is otherwise the same as the programmed data. The portion of the program to be repeated can be identified by its initial and final sequence numbers and the changes such as feed-rate and speed and cutter compensation injected into the system before the initial machining takes place. This is particularly useful when a semifinish pass over a contour is to be followed by a final finish pass. Finally, the all digital operation of the compensation circuit permits the radius value of the cutter to be digitally inserted into the computer and permits more than one tool radius value to be stored in the computer.

DETAILED DESCRIPTION

A profile program for the part to be machined by a numerical control computer is generally segmented, so that each segment defines a continuous motion of the cutting tool within a plane of the part. The principle of operation of the cutter compensation can be understood with reference to FIG. 1 which shows a part 10 being machined by a cutter 12 (dashed circle) along a profile segment 14. It will be appreciated that only a section of part 10 is shown, and that the whole part may be defined by a predeterminable number of profile segments.

Figure 1:
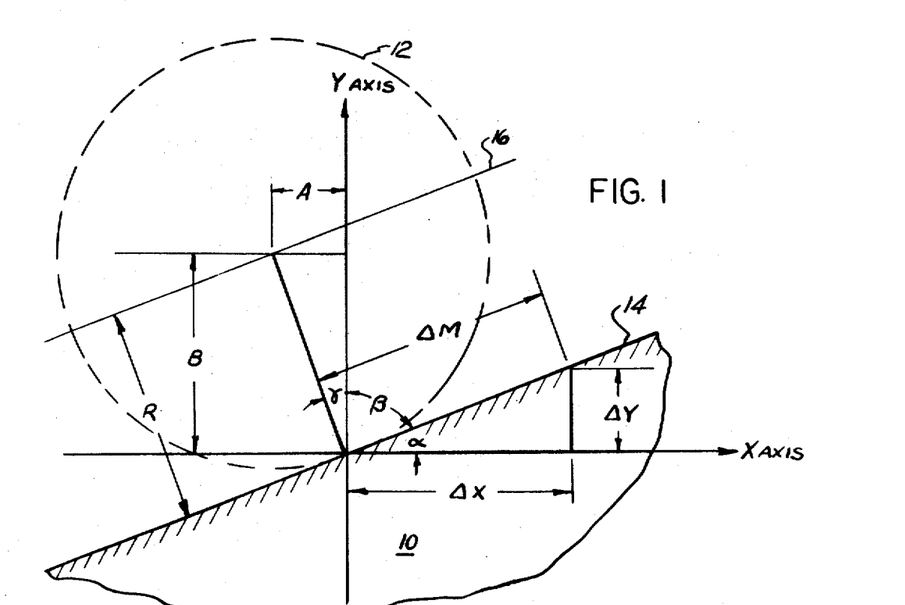
FIG. 1 shows the relationship of the cutter to the part used to illustrate the basic concept.

The profile segment 14 is illustrated as a continuous linear cut in the X, Y plane however it may be a general curved contour definable by circular interpolation. In programming the computer, this segment is represented by one block of data which is sequentially read into the computer and stored until the operation has been completed. It should be noted that the program path defined by segment 14 may be either the actual part profile to be machined, as shown or alternatively, a profile of a path of motion of a tool having an assumed radius. If the programmed path is defined as machined part profile, cutter tool radius compensation will be required for every tool so that the radius value of the cutter compensation is the actual radius of the cutting tool. Alternatively, if the program assumes a tool radius, cutter tool compensation will only be required in those instances when the actual tool radius is different from the assumed radius. Information relating to the tool radius value, is input into the system which makes offset calculation, as fully described hereinafter.

The motion $\Delta M$ of the cutter 12 along any given segment is defined as a composite of two motions along the mutually perpendicular axes of the machine illustrated as the X and Y axes in FIG. 1. In a numerical control machine, the cutter path is controlled by digital pulse signals which index mutually perpdenicular output drives a predetermined distance for each pulse. Further the direction of motion is determined by a sign signal which tells the output drive to move forward or back, up or down, etc. The motion $\Delta M$ may, therefore, be defined by the rates $\Delta X$ and $\Delta Y$. The rates $\Delta X$ and $\Delta Y$ are proportional to the rates at which pulses are received by the individual output drives moving the cutter or the part in the X and Y directions, respectively. The ratio $\Delta X$ and $\Delta Y$ defines the slope of the segment being machined in the X-Y coordinate system. While the illustration of FIG. 1 shows the cutter compensation being active in the X-Y plane, one skilled in the art will recognize that the cutter compensation may be applied to any desired plane, such as the X-Z or Y-Z planes, where Z is normal to both X and Y. It will also be understood that when the part to be cut requires movement with respect to all three axes the motion is defined by $\Delta X$, $\Delta Y$ and $\Delta Z$ and three movements occur simultaneously.

When the profile program does not assume a radius, or alternatively the radius of the cutter tool is different from the assumed radius, the offset path of the tool center can be computed from the radius value R which may be either actual radius of the tool as shown, or the difference between the tool radius and the assumed radius as the case may be. The path the tool center follows as segment 14 is being machined is illustrated as line 16 parallel to segment 14 and offset from segment 14 by distance equal to the radius value R in a direction normal to the segment being machined.

The radius value R may be converted to precise distances A and B along the mutually perpendicular axes X and Y for each profile segment by a solution of the square law equation:

$$A^2 + B^2 - R^2 = 0 \qquad (1)$$

where:

A is the distance measured along the X axis;

B is the distance measured along the Y axis; and

R is the radius value

The relationship of A to B is determined by the programmed motion $\Delta X$ and $\Delta Y$ along the X and Y axis of the machine. As stated above, the programmed motion $\Delta M$ is defined in terms of the pulse rates $\Delta X$ and $\Delta Y$ applied to the mutually perpendicular output drives for a given segment of the profile program. The motion $\Delta X$, $\Delta Y$, and $\Delta M$ define a right triangle wherein the motion $\Delta M$ is at an angle $\beta$ with respect to the X axis and an angle $\alpha$ with respect to the Y axis. The radius value R is normal to $\Delta M$ and may be defined by the distances A and B with respect to the X and Y axis as illustrated. The radius value R defines an angle $\gamma + \beta$ with respect to the ΔM motion. Since $\alpha + \beta = \gamma + \beta = 90°$ the angles $\alpha$ and $\gamma$ are equal and the two right triangles defined by sides ΔX, ΔY, and ΔM and A, B, and R are similar. Therefore A is proportional to ΔY and B is proportional to ΔX and $$A/B = -(\Delta Y/\Delta X) \quad (2)$$

The direction, plus or minus, of the distances A and B can readily be determined from the geometrical relationship of the tool with respect to the part, i.e., the tool is either to the right to left of the part, and the signs of the cutter motions ΔX and ΔY. The following tables show the signs of A and B with respect to the signs of ΔX and ΔY for the tool on both the right and left side of the part.

| TOOL ON LEFT SIDE OF PART | | | | TOOL ON RIGHT SIDE OF PART | | | |
|---|---|---|---|---|---|---|---|
| ΔX | ΔY | A | B | ΔX | ΔY | A | B |
| (+) | (+) | (−) | (+) | (+) | (+) | (+) | (−) |
| (+) | (−) | (−) | (−) | (+) | (−) | (+) | (+) |
| (−) | (−) | (−) | (+) | (−) | (−) | (+) | (−) |
| (−) | (+) | (−) | (−) | (−) | (+) | (+) | (−) |

The tables show that when the tool is on the right side of the part the signs of the offset values A and B are simply inverted from the signs of A and B when the tool is one the left. The position of the tool with respect to the part is normally contained in the program segment along with the signs of the motion segments ΔX and ΔY. Therefore, the signs of A and B can be readily determined from existing data in the numerical control computer.

The radius value R is a known dimension and may be converted into either a fine number of pulses or in the alternative to a predeterminable pulse rate for subsequent electronic solution of Equation (1) by techniques well known in the art. Also A and B pulses can be generated from the X and Y axis data blocks of the active segment of the program profile, at rates proportional to the motion rates ΔX and ΔY satisfying the solution of Equation (2).

Although the preceding was discussed with regards to a linear profile segment, one skilled in the art will recognize that the basic equations are equally applicable to circular interpolation.

The open loop of Equation (1) is straightforward, and may be accomplished by generating a finite number of pulses indicative of the length of the radius value R, and also generating A and B pulses at rates satisfying Equation (2) until the arithmetic solution of Equation (1), i.e. $A^2+B^2-R^2=0$ is obtained. The number of pulses A and B along with their sign are then input into the respective output drives and cause the offset of the center path of the cutter.

Figure 2:
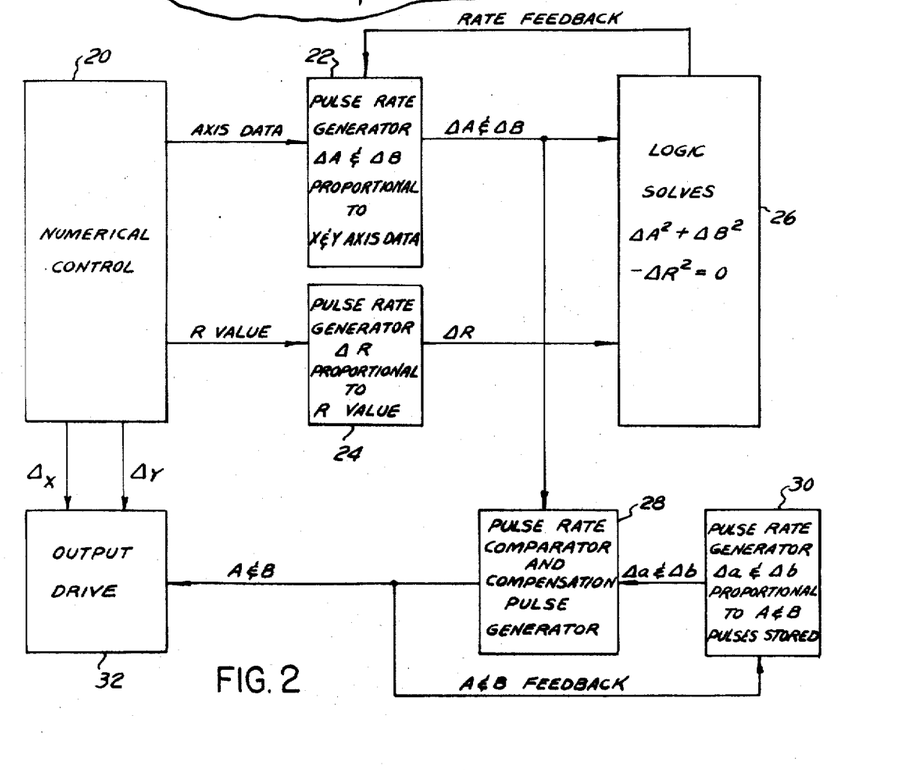
FIG. 2 is a simplified block diagram of the inventive closed loop cutter compensation system.

However, as is well known in the art, a closed loop operation is more stable over extended periods of time and a more efficient method for cutting arcs and circular contours where the A and B compensation valves are continuously changing. FIG. 2 is a block diagram of a simplified closed loop system showing the principles of the invention. A numerical control unit 20 outputs axis data to a pulse generator 22 which produces digital pulses at rates ΔA and ΔB proportional to the X and Y axis data received from the numerical control unit 20. The numerical control unit 20 also inputs the radius value data, R, into a pulse rate generator 24 which produces digital pulses ΔR at a rate proportional to the R data received. The pulse rates ΔA, ΔB, and ΔR are input into a logic circuit 26 which squares the ΔA, ΔB, and ΔR pulses and adds ΔA², ΔB² and (−ΔR²) to solve Equation (1). The logic circuit 26 generates a rate feedback signal which is recirculated back to pulse rate generator 22 and continuously controls the pulse rate of ΔA and ΔB so that $\Delta A^2 + \Delta B^2 - \Delta R^2 = 0$ for each segment of the program. The arithmetic operations for solving the equation are fully described with relation to the preferred embodiment.

The pulse rates ΔA and ΔB are also input to a pulse rate comparator 28 which compares the pulse rates ΔA with a pulse rate Δa and ΔB with a pulse rate Δb. Pulse rates Δa and Δb are generated by a pulse generator 30 generating pulse rates Δa and Δb proportional to the number of previously generated A & B compensation pulses stored therein. When the pulse rates ΔA or ΔB are greater than Δa or Δb respectively, the pulse rate comparator 28 also generates A or B pulses which are input into the output drive 32 as a compensation offset pulse. The A and B compensation pulses are also recirculated back to the pulse rate generator 30 where they increment the number of A or B pulses sotred therein. The pulse rate generator responds to the increased number of stored compensation pulses and increases the rate at which the Δa or Δb pulses are generated. When the pulse rates Δa or Δb are larger than the pulse rates ΔA or ΔB respectively, A or B pulses are subtracted (input as a negative pulse) from the output drive 32 and a like number of A or B pulses are subtracted from the number of pulses in the pulse rate generator 32 thereby reducing the rate at which the Δa or Δb pulses are generated. The A and B pulses generated by the Comparator 28 are added or subtracted from the storage of pulse rate generator 30 until the pulse rates ΔA = Δa and ΔB = Δb. When ΔA = Δa and ΔB = Δb the comparator terminates the generation of offset compensation pulses A and B. In this manner the number of A and B offset compensation pulses input to the output drive 32 are also stored in the pulse rate generator 30 providing the system with a means for remembering the number of active compensating pulses in the ouput drive 32. That has the advantage that for the next profile segment only the number of compensation pulses necessary to update the computed offset need to be generated, rather than clearing the first set of compensation pulses and regenerating a new set of compensation pulses. This is particularly advantageous in circular interpolation.

Figure 3:
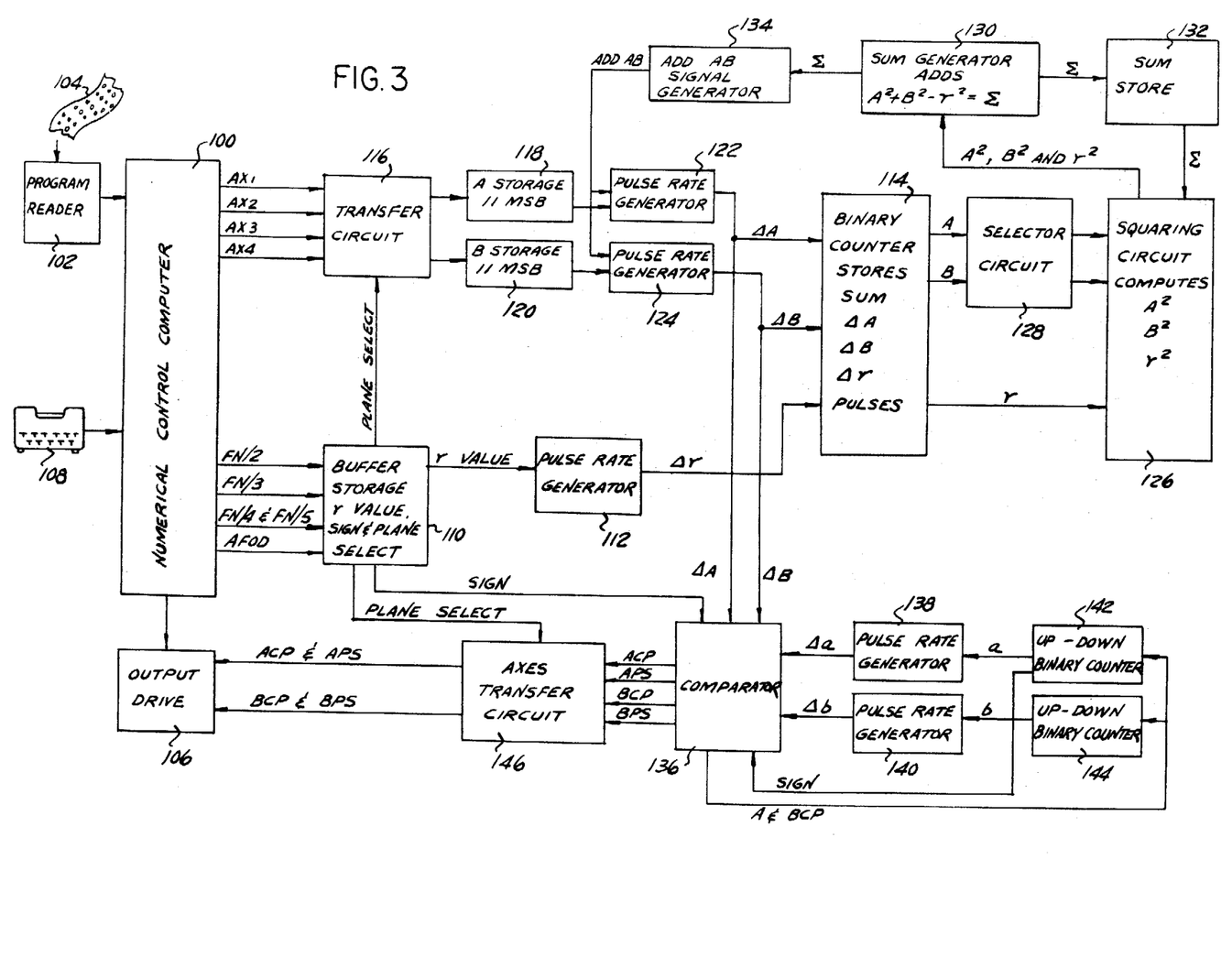
FIG. 3 is a block diagram of a preferred embodiment of the closed loop cutter compensation system.

A preferred embodiment of the digital cutter compensation for numerically controlled machines is shown in the block diagram of FIG. 3. A Numerical Control Computer 100 is shown being controlled by recorded program from a Program Reader 102. The Reader 102 inputs data to the computer from a Prepared Program 104 which may be stored on punched tape as shown or any other media capable of storing the prepared program. The Computer 100 responds to the data input from the reader indicative of each segment of the profile and generates control pulses which control an Output Drive 106 establishing the programmed relationship between the machine's cutter tool and the part to be machined (not shown) for the segment of the programmed profile being acted upon.

In order to provide compensation for the size of the cutter tool, information relating to the size of the cutter tool being used, the axes for which the cutter compensation is desired, and whether or not cutter compensation is desired for the particular machining operation are entered into the Numerical Control Computer 100. In many instances where the profile program is prepared for a cutter having an assumed radius, the information relating to the size of the cutter tool is the difference between the actual tool radius and the assumed radius of the program and whether the difference is positive (larger) or negative (smaller). The embodiment of FIG. 3 assumes the latter case. The difference between the radius of the actual radius of the cutter tool ($r$), the sign of the radius (plus or minus), the axes along which the compensation is desired and the whether or not the compensation is to be active, (cc ON/OFF), are digitally input to the Numerical Control Computer 100 from an operator controlled device such as a Keyboard 108. The data as input to the computer is coded so that it is directed to a designated data storage.

The computer outputs the digital information relating to the sign of the radius (FN/2), the planes in which the cutter compensation is to be active (FN/3) and the size of the radius (FN/4 and FN/5) to a Buffer Storage 110. A Pulse Rate Generator 112 responds to the radius value data stored in the buffer storage and generates a series of digital pulses at a rate $\Delta r$ proportional to the information relating to size of the radius. The $\Delta r$ pulses are input into a Binary Counter 114 where they are stored.

The data indicative of the data blocks for each coordinate axis of a segment of the profile program and the signals indicative of the selected plans are input by Computer 100 and Buffer Storage 110 into a Transfer Circuit 116. The Transfer Circuit 116 selects the appropriate data blocks and transfers the selected data to Buffer Storages 118 and 120 where the 11 most significant bits of each selected data block are stored separately in 4 binary storage registers, two for each data block. The stored data blocks are indicated as A and B respectively. Pulse Generators 122 and 124 generate A and B offset pulses respectively in response to the data stored in their respective Buffer Storages 118 and 120, at rates indicated as $\Delta A$ and $\Delta B$, proportional to the data in the A and B storages. The generated A and B pulses are also input to the Binary Counters 114 where they are stored.

The number of A and B pulses stored in the Binary Counter 114 at any given time are alternately input to a Squaring Circuit 126 consisting of 4 bit full adder elements by means of a Select or Circuit 128. The $r$ pulses are directly supplied to Squaring Circuit 126 from Counter 114. The values of $A^2$, $B^2$, and $r^2$ are computed in Squaring Circuit 126.

The radius value $r$ is summed with A and B in the first full adder elements. By loading the adder one bit position down from the least significant bit portion, the A, B, and $r$ values are doubled. A "1" is added into the carry input of the first full adder to generate the result of $2A + 1$, $2B + 1$ and $2r + 1$ to generate $A^2$, $B^2$, and $r^2$, respectively using techniques well known in the art.

The $A^2$, $B^2$ and $r^2$ values are supplied to a Sum Generator 130 where the squared values are added in accordance with the relationship $A^2+B^2-r^2=\Sigma$. The results of the sum of the squares ($\Sigma$) is stored in Sum Store 132 which can include two hex flop-flops and one quad flip-flop. The stored sum is recirculated through the full adders in the Squaring Circuit 126 during the arithmetic operation.

Sum Generator 130 inputs the sum of the arithmetic operation $\Sigma$ into an Add AB Signal Generator 134 which generates an Add AB signal when the sum of the arithmetic operation is negative indicating that the number of A and B pulses stored in the Binary Counter 114 is less than the $r$ value. The Add AB signal is recirculated back to the Pulse Generators 122 and 124 and is operative to activate the pulse rate generators to produce A and B pulses at rates proportional to the respected stored axes data until the equation $A^2+B^2-r^2=0$ is satisfied. In this manner the offset pulse rates $\Delta A$ and $\Delta B$ are proportional to the offset radius along the two selected coordinate axes.

Figure 4:
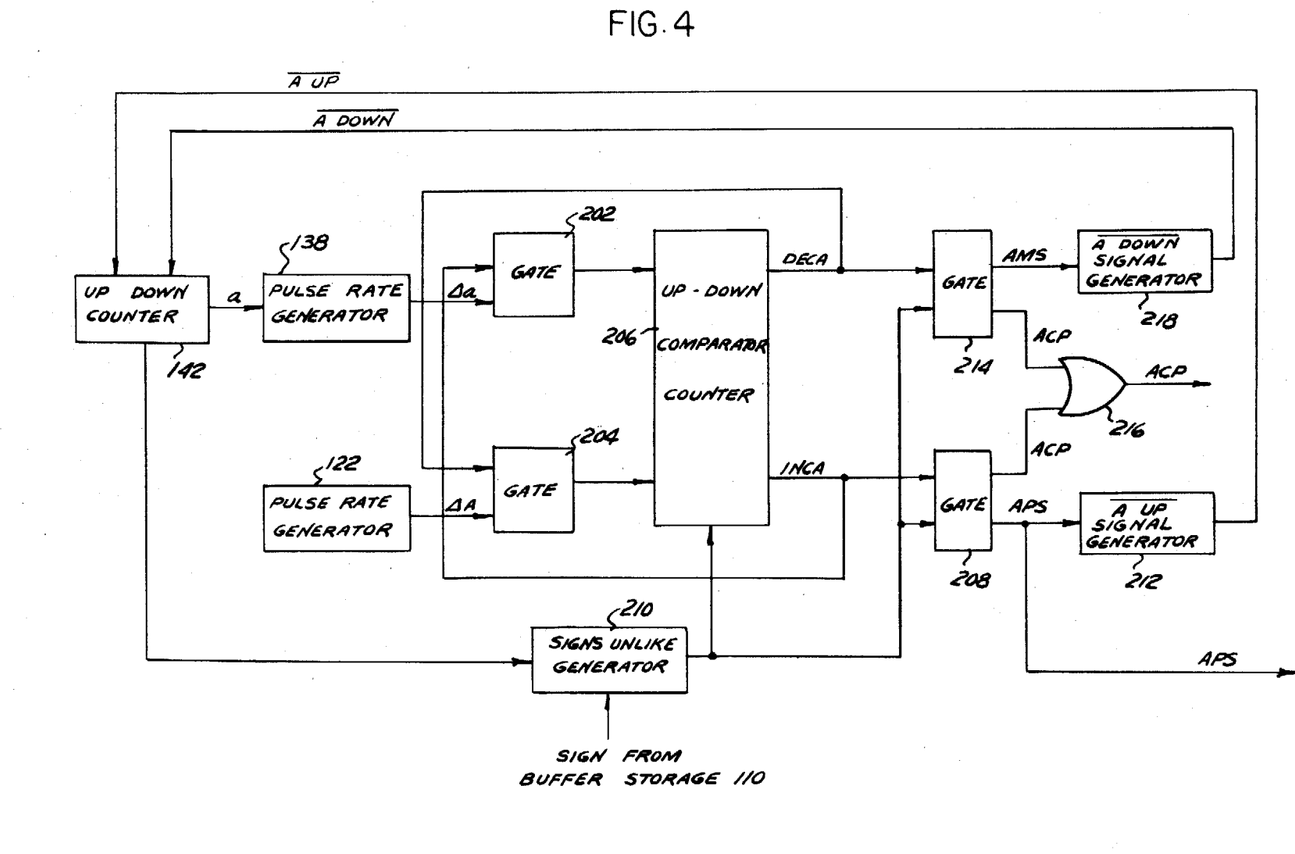
FIG. 4 is a block diagram of the comparator and associated circuits.

The offset pulse rates $\Delta A$ and $\Delta B$ and the sign of the radius value from Buffer 110 are input to a Comparator 136 where the pulse rates $\Delta A$ and $\Delta B$ are compared to the composition pulse rates $\Delta a$ and $\Delta b$ respectively generated by two Compensation Pulse Rate Generators 138 and 140 in response to the number of compensation pulses stored in parallel sets of Up-down Binary Counters 142 and 144 respectively. on The structure of the comparator 136 and its interrelationship with the Generators 138 and 140, and their associated Counters 142 and 144 are explained with reference to FIG. 4. FIG. 4 illustrates only that section of the Comparator 136 which is responsive to the pulse rates $\Delta A$ and $\Delta a$ and includes Generator 138 and Counter 142. The section of the comparator responsive to the $\Delta B$ and $\Delta b$ pulses is identical and need not be repeated. The $\Delta A$ pulse rate and $\Delta a$ pulse rates are input into the Comparator 136 through a pair of Gates 202 and 204 respectively. The pulses appearing at the gates are input in an Up-down Comparator Counter 206 and step the comparator counter either up or down dependent upon which gate supplies the pulse. When the pulse rate $\Delta A$ is larger than $\Delta a$ the counter is counted up and generates an increase A signal (INC A). The INC A signal is recirculated to the $\Delta a$ Gate 204 and counts the Up-Down Counter 206 DOWN one increment keeping the counter in equilibrium. The INC A signal is also input into a Gate 208 controlled by a Sign Unlike Signal Generator 210. Generator 210 is responsive to the programmed sign of the radius stored in the Buffer Storage 110 and the active offset sign generated by the Up-Down Binary Counter 142. When the radius and active offset signals are alike Generator 210 causes Gate 208 to generate an A Compensation Pulse (ACP) and an A Plus Signal (APS). The APS signal is input into a Signal Generator 212, generating an A Not Up signal ($\overline{AUP}$) to prevent the Up-Down Counter 142 from counting up. The $\overline{AUP}$ Generator 212 responds to the APS and inverts the $\overline{AUP}$ signal and increments a compensation pulse into the Binary Counter 142 where it is added to the number of compensation pulses already stored in the counter. The Pulse Rate Generator 138 responds to the increased number of stored pulses in Counter 142 causing an increase in the rate at which the $\Delta a$ pulses are generated. In this manner the number of compensation pulses stored in the Counter 142 is continuously incremented until the compensation pulse rate $\Delta a$ is equal to the offset pulse rate $\Delta A$. The number of compensation pulses stored in the Counter 142 is equal to the number of compensation pulses (ACP) since they both have their origin at Gate 208.

When the pulse rate Δa is larger than ΔA, Generator 210, and Gate 214 cooperate to invert the $\overline{\text{A DOWN}}$ signal from Generator 218 in the same manner as the $\overline{\text{AUP}}$ signal is inverted and the Counter 142 is incremented downward until the pulse rate Δa equals pulse rate ΔA. The A compensation pulses (ACP) are generated by either Gate 208 responding to an A INC signal or Gate 214 responding to an A DEC signal. The ACP signals are input to an OR Gate 216 which passes the ACP signals to the rest of the system. The A Plus Sign (APS) is also passed to the rest of the system and controls whether the ACP pulses are to be added or subtracted from the number of compensation pulses active in the output drives. The occurrence of Signs Unlike Signal applied to the Comparator Counter 206 clears the counter and terminates the generation of INC A and DEC A pulses. The Signs Unlike Signal applied to Gate 214 cause Gate 214 to generate an A Minus Signal (AMS) and ACP pulses. The AMS signal inverts the $\overline{\text{A DOWN}}$ signal and the Counter 142 is counted down at the same rate as the ACP pulses are generated until all the counts are removed. The generated ACP pulses along with their appropriate sign are output to the rest of the system effectively removing the old compensation valve.

Returning to FIG. 3, the ACP, APS, BCP and BPS signals generated in Comparator 136 are input into an Axis Transfer Circuit 146 which transfers these signals to the appropriate Output Drives 106 in accordance with the plane select signals from Storage 110.

The generation of the timing signals which control the operation of the systems are discussed with reference to FIGS. 5a and 5b and the Waveforms on FIG. 6. After the data relating to the cutter radius, the sign of the offset, and the planes selected have been input to their appropriate storage, Computer 100 of FIG. 3 generates an Auto Feed (AFOD) signal which starts the cutter compensation. The compensation thereafter is controlled by a digital clock (not shown) operating at a predetermined frequency (CLK). The clock also generates a one-third millisecond pulse and repetitive timing pulses T11 and T24 respectively, The digital clock pulses, the repetitive timing signal T11 and T24 are shown as Waveform A, B and C respectively in FIG. 6.

Figure 5A:
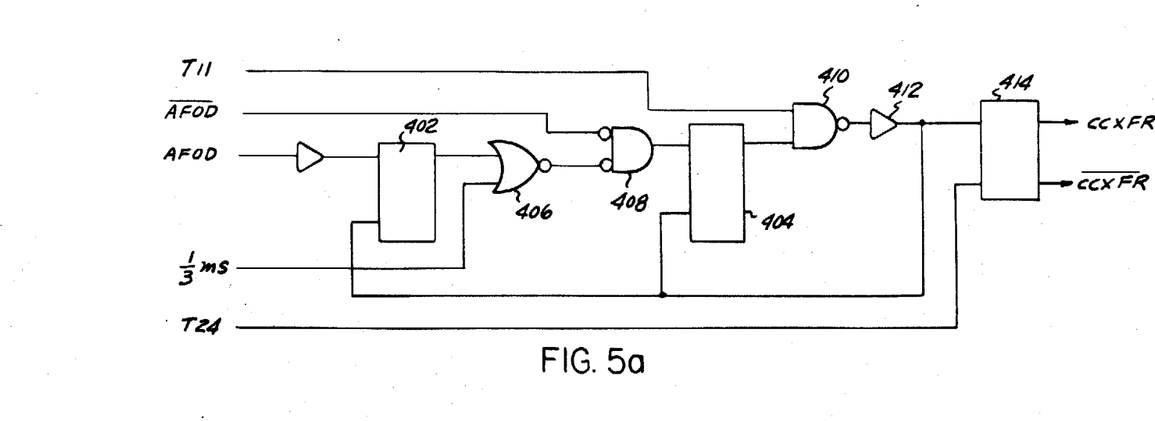
FIG. 5a is a circuit diagram for the generation of the cutter compensation transfer signal.
Figure 5B:
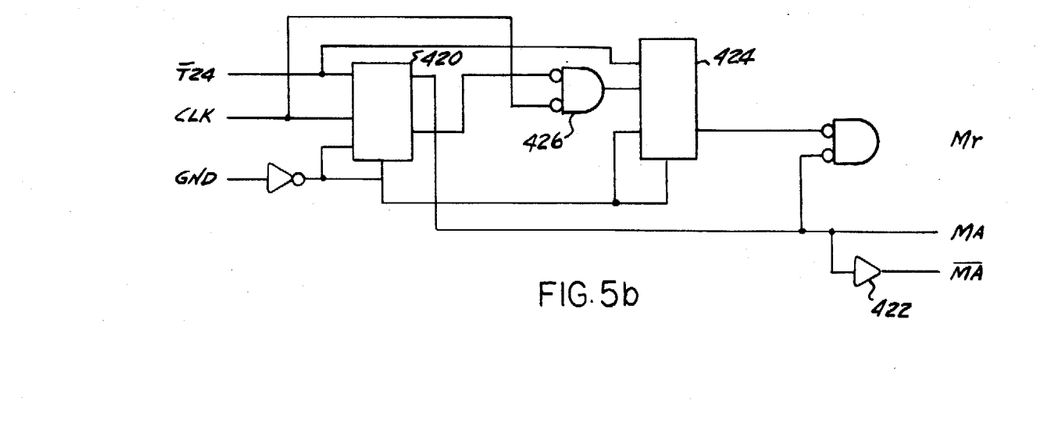
FIG. 5b is a circuit diagram for the generation of the MA, $\overline{MA}$, and Mr rate control signals.

A cutter compensation transfer (CCXFR) signal is generated in response to the AFOD signal, the T11 signal, the T24 signal and the one-third millisecond pulse as shown in FIG. 5a. The AFOD signal from the computer is temporarily stored in Flip-Flop 402. The stored AFOD signal is subsequently transferred to Flip-Flop 404 by means Gates 406 and 408 in response to the one-third ms pulse. Flip-flop 404 stores the AFOD signal until time T11. The T11 signal applied to Gate 410 in coincidence with a signal that AFOD is stored in Flip-Flop 404, passes the AFOD through Amplifier 412 to Flip-Flop 414. The amplified AFOD signal sets Flip-Flop 414 and clears Flip-Flops 402 and 404. In its "SET" state Flip-Flop 414 generates a cutter compensation transfer ($\overline{\text{CCXFR}}$) signal until reset to its initial or "Reset" state by the T24 signal. In the Reset state Flip-Flop 414 generates a not cutter compensation transfer ($\overline{\text{CCXFR}}$) signal. The $\overline{\text{CCXFR}}$ signal shown as Waveform D and FIG. 6 is generated from T12 to T24 at a one-third ms rate thereafter, and is the sample time allowed to transfer the axes integrands into the storage registers 118 and 120 where they are stored until the next sample time.

Multiplier rate signals, MA, $\overline{\text{MA}}$ and Mr), for converting the data stored in the buffer storages 110, 118 and 120 to pulse rates, are generated by a series of binary dividers. Referring to FIG. 5b a CLK signal and a $\overline{\text{T24}}$ signal are input into a Flip-Flop 420. Flip-Flop 420 divides the CLK pulse rate by 2 and produces binary MA pulses at a rate of CLK/2. The pulses $\overline{\text{MA}}$ and its convalution MA generated by inverter amplifier 422 are input to the pulse rate generators 122 and 124 respectively (FIG. 3) and control the rate at which the binary multipliers operate to produce the desired ΔA and ΔB pulses. The MA pulses shown as waveform E in FIG. 6 are also used to control the Selector Circuit 128 (FIG. 3) where the MA pulses gate the A data stored in the Binary Counter 114 into the Squaring Circuit 126 and the $\overline{\text{MA}}$ pulses gate the B data from the Binary Counter to the Squaring Circuit. The $\overline{\text{T24}}$ signal delays by one CLK pulse the generation of the next sequential set of MA pulses to maintain the proper sequence of operation. The MA pulses are also input to Flip-Flop 424 through a Gate 426 controlled by the clock signal CLK. Flip-Flop 424 divides the MA pulse rate by 2 and generates Mr pulses at a rate approximately equal to CLK/4. The Mr pulses shown as waveform F in FIG. 6 are input to the Pulse Rate Generator 112 and controls the rate at which the binary multiplier operates to produce the desired Δr pulse rate. The Mr pulses are also applied to the Pulse Rate Generators 138 and 140 where they control the rate of the binary multipliers generating the Δa and Δb pulses respectively.

Figure 6:
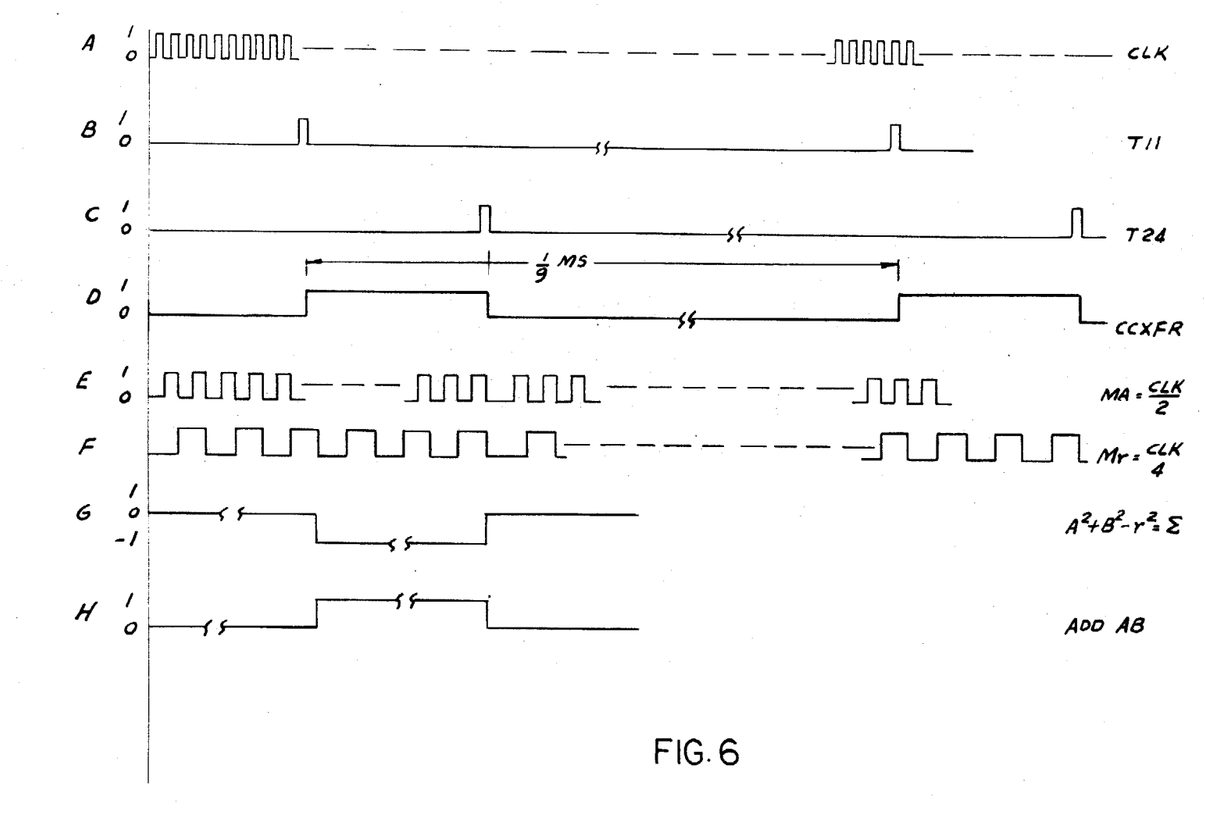
FIG. 6A is the waveform of the clock signal.
FIG. 6B is the waveform of the T-11 signal.
FIG. 6C is the waveform of the T-24 signal.
FIG. 6D is the waveform of the MA signal.
FIG. 6E is the waveform of the Mr signal.
FIG. 6F is the waveform of the $\Sigma$ 15 signal.
FIG. 6G is the waveform of the Add AB signal.

The Σ signal generated by the Sum Generator 130 is illustrated as Waveform G on FIG. 6 and the resultant Add AB signal generated by the Add AB Signal Generator 134 is illustrated as Waveform H.

Figure 7:
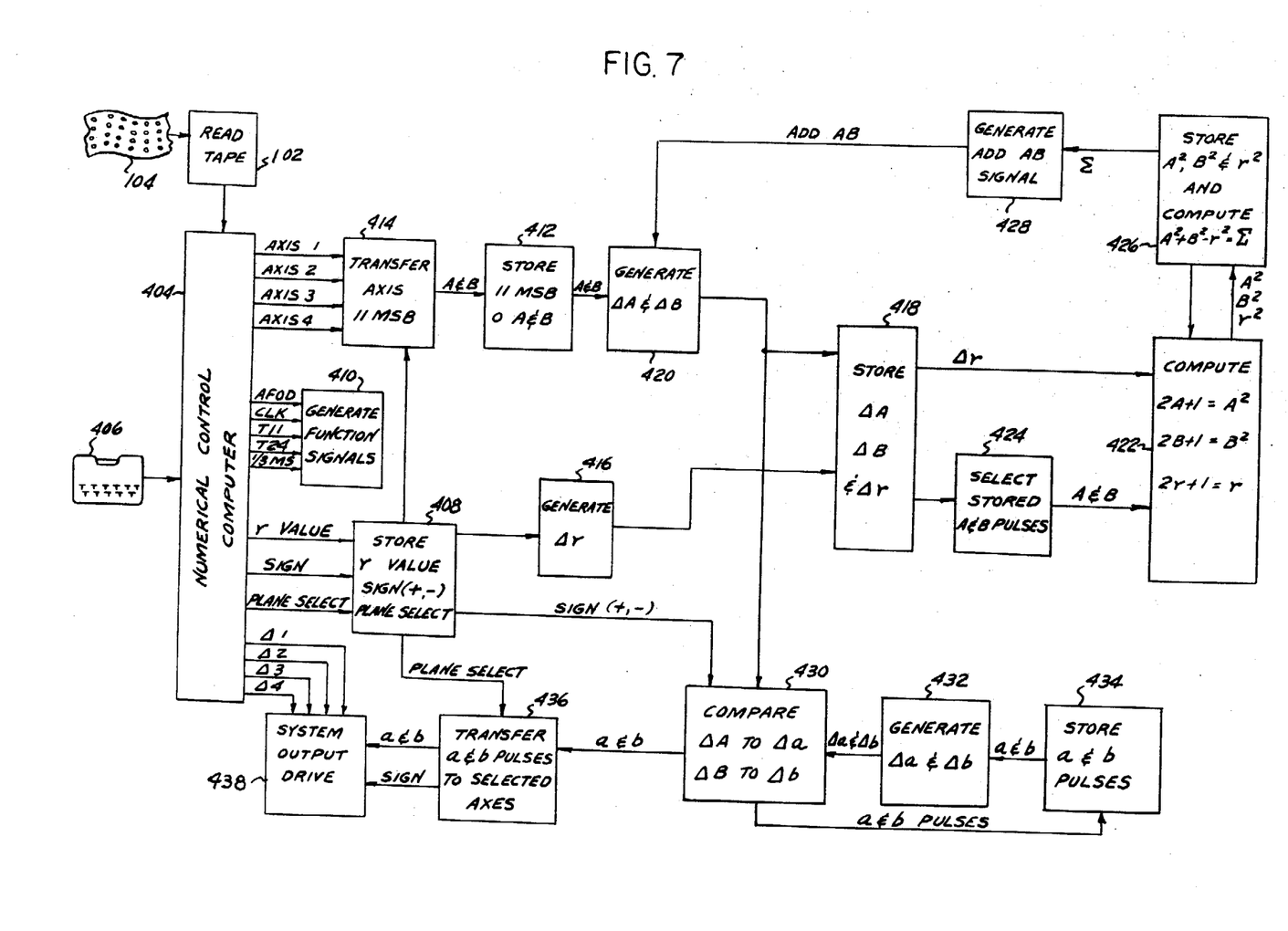
FIG. 7 is a flow diagram of the data and signals in the system.

FIG. 7 is a flow chart showing the course of the data through the system and the generation of the required control signals useful in understanding the operation of the inventive system.

A Program 104 containing the programmed profile which may or may not include an assumed radius, is read by a Tape Reader 402. The information available on the tape is converted into digital form by the tape reader and is input into the Numerical Control Computer 404. By means of an appropriate input device, such as a Keyboard 406, the operation digitally inserts into the Numerical Control Computer 404 the radius value (r), the sign of the radius value where the program includes an assumed radius, the two planes in which the cutter compensation is to be active, when the program contains more than two active axes and whether or not the cutter compensation is to be used with the active program. Each input, inserted by the operation, is coded so it may be input by the Numerical Control Computer into a designated storage.

The two selected planes, the radius sign, and radius value (r) are stored in Buffer Storage 408. After the data is input into the storage, the computer generates an Auto Feed (AFOD) signal which starts the interpolation process. Coincident with the generation of the AFOD signal the internal clock of the numerical control computers starts, and the timing signals which control the operation of the system are generated 410 as discussed with reference to FIGS. 5a, 5b and 6. Because the function signals are inherent in particular blocks of the flow diagram, the lead lines are omitted.

The AFOD signal is stored until T11 to permit synchronization of the cutter compensation as previously explained. In the interval from T12 through T24 the cutter compensation transfer function (CCXFR) signal allows the transfer 414 of the 11 most significant bits (MSB) from each data block of the selected planes from the Computer 404 to an integrand storage where the 11 MSB of each data block are stored 412.

Upon termination of the CCXFR signal, a bias ($\overline{Mr}$ $\overline{CCXTR}$ $\overline{AFOD}$ signal) is removed from a pulse rate generator and the pulse generator starts generating pulses $\Delta r$ 416 at a rate proportional to the value of $r$ stored in block 408. The generated $\Delta r$ pulses are stored in block 418 in a binary counter for subsequent arithmetic operations. Also, upon completion of the CCXFR signal the bias is removed from the $\Delta A$ and $\Delta B$ pulse rate generators and the generators generate $\Delta A$ and $\Delta B$ pulses 420 at a rate proportional to the value of the 11 most significant bits for the selected planes A and B stored in block 412. The $\Delta A$ and $\Delta B$ pulses are also input into the binary counter where they are stored 418. The number of A and B pulses stored in the binary counter are alternatively selected, block 424, by means of a selector circuit, an input into a squaring circuit along with the stored r where the squaring operation 2 $A+1 = A^2$, $2B+1 = B^2$, and $2r+1 = r^2$, block 422 is performed. The A and B pulses are selected on a time shared basis as a function of the timing pulses MA and $\overline{MA}$. The MA pulse selects the A pulses and the $\overline{MA}$ pulse selects the B pulses. The values $A^2$, $B^2$, and $-r^2$ are then summed in block 426 to solve the equation $A^2 + B^2 - r + \Sigma$. The stored sum of the squaring operation are recirculated to the squaring circuit during the arithmetic operation. When the sum of the arithmetic operation $\Sigma$ is negative indicating that the solution of the equation is not exact, i.e., $A^2 + B^2 - r^2 \neq 0$, an Add AB signal is generated as indicated by block 428 and is recirculated back to the $\Delta A$ and $\Delta B$ pulse rate generators. The Add AB signal is operative to remove an inhibit bias on the pulse generators permitting more A and B pulses to be generated at rates $\Delta A$ and $\Delta B$ respectively. When the arithmetic operation is zero, the Add AB signal is terminated stopping further generation of $\Delta A$ and $\Delta B$ pulses. In this manner, the A and B pulses are generated at rates which satisfies the relationship $\Delta A^2 + \Delta B - \Delta r^2 \neq 0$ which is the desired offset rate for the two selected axes.

The pulse rates $\Delta A$ and $\Delta B$ generated by the pulse rate generators are compared in block 430 to cutter compensation pulse rates $\Delta a$ and $\Delta b$, respectively, generated in block 432 in response to compensation pulses stored in block 434.

Figure 8:
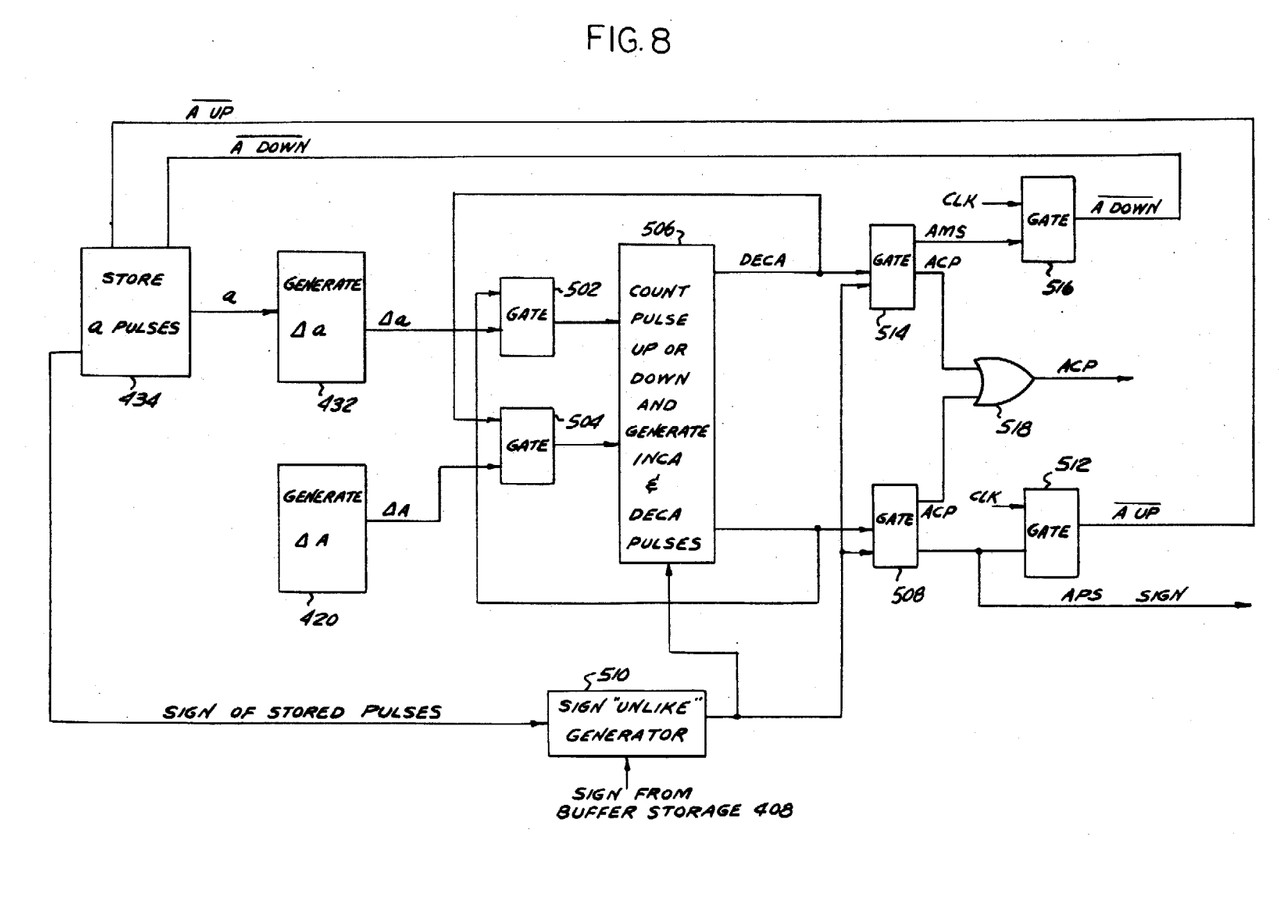
FIG. 8 is a flow diagram of the data and signals in the comparator.

The operation of comparing in block 430 and associated functions is best explained with reference to FIG. 8. FIG. 8 illustrates only those functions of the comparator associated with the pulse rates $\Delta A$ and $\Delta a$. The $\Delta A$ and $\Delta a$ pulse rates are gated, by block 502 and 504 into an Up-Down Counter and count, function block 506, the counter up and down in accordance with which gate the pulses appear. When the pulse rate $\Delta A$ is larger than the pulse rate $\Delta a$ the excess A pulses count the Up-Down counter "UP" which generates increase A pulses (INCA). The INCA pulses are recirculated to the opposite gate and count the Up-Down counter "DOWN" keeping the Up-Down counter in a state of equilibrium. The INCA signal is also input into a gate controlled by a "Sign Unlike" signal generated in block 510 in response to the sign of the radius value stored in block 408 and the active offset sign of the stored A pulse stored in block 434. An A Compensation Pulse (ACP) and an A Plus Sign (APS) are generated in block 508 for each INCA pulse received in the absence of a "Sign Unlike Signal". The APS signal is input into a gate generating an A Not Up Signal ($\overline{A\ UP}$), block 512. The $\overline{AUP}$ prevents the Up-Down counter in the compensation storage 434 from counting up. The APS signal terminates the $\overline{AUP}$ signal and increments the number of A compensation pulses stored in block 434. The compensation pulse rate generator responds to the increased number of pulses in the compensation storage and increases the rate at which the compensation pulses $\Delta a$ are generated in block 432. In this manner the Up-Down counter of the compensation storage is continuously incremented until the pulse rates $\Delta A$ and $\Delta a$ are equal. When $\Delta a$ is larger than $\Delta A$, the excessive a pulses count the Up-Down counter DOWN and generate a decrease A (DEC A) pulses. The DEC A pulses are recirculated and count the Up-Down counter up to establish equilibrium. The DEC A signal is also gated into a gate generating in block 514 an A Minus Signal (AMS) and an A Command Pulse (ACP). The AMS signal is input into a gate generating in block 526 an A Not Down Signal ($\overline{A\ DOWN}$) and terminates the $\overline{A\ DOWN}$ signal and decrements the number of A compensation pulses stored in block 434. The compensation pulse rate generator responds to the decreased number of stored pulses and decreases the rate at which the $\Delta a$ pulses are generated in block 432. In this manner the number of pulses stored, in the Up-Down counter is controlled so that the compensation pulse rate generator generates compensation pulses at a rate equal to the rate at which the $\Delta A$ pulses are generated.

The ACP pulses generated in either blocks 508 and 524 are gated into an OR Gate 518 which generates an ACP pulse when an ACP pulse is generated in either block 508 or 514.

The generation of $\Delta b$, B Command Pulses (BCP) and B Plus Signals (BPS) is identical to the generation of $\Delta a$, A Command Pulses (ACP) and the A Plus Sign (APS).

Referring back to FIG. 7, the ACP and BCP pulses generated along with their sign APS and BPS are transferred, block 436, into the proper interpolator in the output drive 438 in accordance to the plane select data stored in block 408.

When the cutter compensation is active, the cutter must be programmed into the compensation plane as far from the finished surface as the maximum compensation required to permit the offset to be input into the output drive before the cutter makes its first cut. Once the offset compensation is established, it will remain active through subsequent dwells and motion along any axes until the cutter compensation is turned off.

When cutter compensation is used, the actual cutter path is offset normal to the programmed path. Consequently, during an abrupt change in direction, such as when cornering with linear interpolation, the end of the actual cutter path associated with the preceding block is not coincident with the start of the cutter path of the following block. This results in a small corrective motion as the cutter positions itself from the old offset position to the new offset position and may result in a mark on the part. To avoid this, it is necessary that, for programs where cutter compensation may be employed, all corners either inside or outside should be programmed as radii having a radius at least as large as the largest cutter offset that can be employed.

While a preferred embodiment of the invention has been disclosed, it will be apparent to those skilled in the art, that changes may be made to the invention as set forth in the appended claims, and certain features of the invention may be used to advantage without corresponding use of others. For example, the output pulse rates $\Delta A$ and $\Delta B$ may be converted to compensation pulses A and B by other means well known in the art. Accordingly, it is intended that the illustrative and descriptive materials herein be used to illustrate the principles of the invention and not limit the scope thereof.

What is claimed is:

1. In a numerically controlled machine having computing and storage means, operative to control the movement of a cutter tool to thereby machine an article in response to a segmented profile program defined with respect to at least two perpendicular coordinate axes, each segment of said program including a block of digital data for each axis, each block of data being individually indicative of the profile along one of said coordinate axes, and wherein said computing and storage means converts said data blocks into sets of control pulses operative to actuate output drives individually associated with each coordinate axes to control the relationship between said cutter tool and said article; a system for providing compensation for the size of said cutter tool comprising:

means for inserting information relating to size of said cutter tool into said numerically controlled machine, means responsive to said information relating to the size of said cutter for generating a radius pulse proportional to said information;

means responsive to said radius pulse rate and said blocks of digital data for generating at least two offset pulse rates having a predetermined relationship to said radius pulse rates and said profile segment; and means responsive to said two offset pulse rates for generating compensation pulses operative to offset said output drives thereby compensating for the size of said cutter tool.

2. The system of claim 1 wherein said storage means is capable of storing information relating to a plurality of tool sizes, said means for inserting further including:

means for digitally inserting into said storage, a plurality of different cutter tool sizes; and means for selecting from said stored plurality of tool sizes, information relating to the size of the cutter being used.

3. The system of claim 2 wherein said profile is defined in more than two coordinate axes and said numerical control machine has an output drive for each axis about which said profile is defined, said system further including:

means for generating axes signals indicative of each coordinate axes about which the cutter compensation is to be active;

means responsive to said axies signals for transferring, to said means for generating pulse rates, the data blocks indicative of said axes; and means responsive to said axes signals for applying said compensation pulses to the output drives associated with said axes.

4. The system of claim 3 wherein said segmented profile program includes an assumed cutter size, said information relating to the cutter size is a radius value, said radius value is the difference between the assumed cutter radius and the actual cutter radius and said means for inserting further includes means for inserting the sign of said difference.

5. The system of claim 4 wherein said means for generating a radius pulse rate includes:

means for storing said selected information relating to said cutter size; and means for converting said stored information into digital radius pulses at a rate proportional to the size of said tool.

6. The system as claimed in claim 4 wherein said compensation pulse generating means includes:

means for generating compensation pulse rates proportional to a number of stored compensation pulses; and means for comparing said offset pulse rates with said compensation pulse rates for generating compensation pulses when said compensation pulse rates are different from said offset pulse rates, and said compensation pulses are continuously input into said compensation pulse generating means storage until said compensation pulse rate is equal to said offset pulse rate.

7. The system of claim 4 wherein said means for generating offset pulse rates includes:

means for storing said transferred blocks of data;

means for converting the stored data into two sets of offset pulses, wherein said first set of offset pulses are generated at a rate $\Delta A$ proportional to the block of data indicative of the profile segment along one coordinate axes, and said second set of offset pulses are generated at a rate $\Delta$proportional to the block of data indicative of the profile segment along said second coordinate axes; and means for computing a predetermined relationship between said offset pulse rates and said radius pulse rate and for controlling the rates at which said offset pulses are generated to satisfy said predetermined relationship.

8. The system as claimed in claim 7 wherein said predetermined relationship is given by the equation $A^2 + B^2 - r^2 = 0$ wherein A is the number of pulses generated by said pulse rate generating means in response to the data block indicative of the profile segment along one of said axes, B is the number of pulses generated by said pulse rate generating means in response to the data block indicative of the profile segment along another of said axes, and r is the number of radius pulses generated, said means for computing includes:

means for storing A, B, and r pulses generated by the respective pulse rate generators;

means for squaring the stored A, B, and r pulses to generate $A^2$, $B^2$ and $r^2$; and means for summing $A^2$ and $B^2$ with $-r^2$ and for generating an add signal when the sum is a negative number, wherein said add signal is operative to control the rate at which said A and B pulses are generated.

9. The system as claimed in claim 8 wherein said compensation pulse rate generating means includes:

first storage means for storing compensation pulses;

first generating means for generating pulses at a rate $\Delta a$ proportional to the number of compensation pulses stored in said first storage means;

second storage means for storing compensation pulses; and second generating means for generating pulses at a rate $\Delta b$ proportional to the number of compensation pulses stored in said second storage means.

10. The system as claimed in claim 9 wherein said compensation pulse generating means comprises:

first comparing means for comparing said $\Delta A$ offset pulse rate with said $\Delta a$ compensation pulse rate for generating a first signal when $\Delta A$ is larger than $\Delta a$, and a second signal when $\Delta a$ is larger than $\Delta A$ and no signal when $\Delta A = \Delta a$;

means responsive to said first and second signals generated by said first comparing means for generating compensation pulses, a signal indicative of which of said two pulse rates, $\Delta A$ or $\Delta a$, is larger and a signal operative to index the generated compensation pulses into said first compensation pulse storage means until said pulse rate $\Delta a$ is equal to said pulse rate $\Delta A$;

second comparing means for comparing a $\Delta B$ offset pulse rate with said $\Delta b$ compensation pulse rate and for generating a first signal when $\Delta B$ is larger than $\Delta b$ and a second signal when $\Delta b$ is larger than $\Delta B$; and means responsive to said first and second signals generated by said second comparing means for generating compensation pulses, a signal indicative of which of said two pulse rates $\Delta B$ or $\Delta b$, is larger and a signal operative to index the generated compensation pulses into said second compensation pulse storage means until pulse rate $\Delta b$ is equal to pulse rate $\Delta B$.

11. In a numerically controlled machine having computing and storage means operative to control the movement of a cutter tool to thereby machine an article in response to a segmented profile program defined with respect to at least two perpendicular coordinate axes, each segment of said program including a block of digital data for each axes, each block of data being individually indicative of the profile along one of said coordinate axes and wherein said computing and storage means converts said data blocks into sets of control pulses operative to actuate output drives individually associated with each coordinate axes to control the relationship between said cutter tool and said article, a method for providing compensation for the size of said cutter tool comprising:

inserting information relating to the size of the cutter tool into said numerically controlled machine;

generating a tool size pulse rate proportional to said inserted information;

generating at least two offset pulse rates, having a predetermined relationship to said digital blocks of data and to said tool size pulse rate;

generating from said at least two offset pulse rates at least two sets of compensation pulses, one set of compensation pulses individually associated with each of said offset pulse rates;

applying said sets of compensation pulses to said output drives.

12. The method of claim 11 wherein said storage means is capable of storing information relating to a plurality of tool sizes, said step of inserting further includes the steps of:

inserting into said storage a plurality of different tool sizes; and selecting from said stored plurality of tool sizes, information relating to the size of the tool being used in the numerically controlled machine.

13. The method of claim 12 wherein said profile program is defined in more than two coordinate axes and said numerically controlled machine has an output drive for each axis about which said profile is defined;

said step of inserting further includes the step of inserting information relating to each axes in which the cutter compensation is to be operative;

said step of generating offset signals further includes the step of selecting the data blocks indicative of the axes information so inserted; and said method further includes the step of transferring said generated compensation pulses to the output drives associated with said inserted axes information.

14. The method of claim 11 wherein said segmented profile program includes an assumed tool size, said step of inserting comprises the step of inserting a radius value, said radius value being the difference between the size of the actual tool and the size of said assumed tool and the sign of the difference between the assumed and actual tool size.

15. The method of claim 14 wherein said step of generating a tool size pulse rate comprises the steps of:

storing said selected information relating to the size of said tool; and generating from said stored information a pulse rate proportional to said stored information.

16. The method of claim 15 wherein said step of generating offset pulse rates comprises the steps of:

transferring the data blocks associated with said axes information to a storage, where said data blocks are stored;

generating two offset pulse rates, one rate $\Delta A$ proportional to the data block associated with one of the selected axes and the second pulse rate $\Delta B$ proportional to the data block associated with the other selected axes;

computing from said tool size pulse rate, and from said $\Delta A$ and $\Delta B$ offset pulse rates a predetermined relationship; and generating an add signal when said computed predetermined relationship is not satisfied, said add signal operative to enable said step of generating to generate said $\Delta A$ and said $\Delta B$ offset pulse rates proportional to the data blocks of said selected axes and at rates satisfying said predetermined relationship.

17. The method of claim 16 wherein said step of generating compensation pulses comprises the steps of:

storing previously generated compensation pulses;

generating a compensation pulse rate proportional to a number of stored compensation pulses; and comparing said compensation pulse rates to said offset pulse rates to generate compensation pulses when said offset and compensation pulse rates are different.

18. The method of claim 16 wherein said predetermined relationship is given by the equation $A^2 + B^2 - r^2 = 0$ wherein A is the sum of the pulses generated by said $\Delta A$ pulse rate after a given period of time, $\Delta B$ is the sum of the pulses generated by said $\Delta B$ pulse rate after the same period of time, and $r$ is the sum of tool size pulses generated by the pulse rate $\Delta r$ after the same period of time, said step of computing and said step of generating an add signal comprises the steps of:

storing said A, B, and r pulses;

squaring at predeterminable intervals of time the stored pulses A, B, and $r$ to generate $A^2$, $B^2$, and $r^2$ values;

summing $A^2$ and $B^2$ with $-r^2$ to generate a sum signal; and generating an add signal when said sum signal is negative and terminating said add signal when said sum signal is not negative.

19. The method of claim 18 wherein said step of generating compensation pulse rates comprises the steps of:

storing a first set of compensation pulses;

generating pulses at a rate $\Delta a$ proportional to the number of pulses in said first set of stored compensation pulses;

storing a second set of compensation pulses;

generating pulses at a rate $\Delta b$ proportional to the number of pulses in said second set of stored compensation pulses;

further said step of comparing includes:

comparing said $\Delta A$ offset pulse rate with said $\Delta a$ compensation pulse rate and generating a first signal when $\Delta A$ is larger than $\Delta a$ and a second signal when $\Delta a$ is larger than $\Delta A$; and comparing said $\Delta B$ offset pulse rate with said $\Delta b$ compensation pulse rate and generating a first signal when $\Delta B$ is larger than $\Delta b$ and a second signal when $\Delta b$ is larger than $\Delta B$;

generating in response to said first and second signals resulting from the comparing said $\Delta A$ and $\Delta a$ pulse rates, an A Compensation Pulse, a signal indicative of which of said two pulse rates, $\Delta A$ or $\Delta b$ is larger, and a signal operative to index the stored number of compensation pulses associated with the generation of $\Delta a$ pulses;

generating in response to said first and second signals resulting from the comparing of said $\Delta B$ to $\Delta b$ pulse rates, a B compensation pulse, a signal indicative of which pulse rate, $\Delta B$ or $\Delta b$, is larger and a signal operative to index the stored number of compensation pulses associated with the generation of $\Delta b$ pulses; and wherein said stored number of compensation pulses associated with the generation of $\Delta a$ and $\Delta b$ pulses are continuously indexed until said a compensation pulse rate is equal to said $\Delta A$ offset pulse rate, and said $\Delta b$ compensation pulse rate is equal to said $\Delta B$ offset pulse rate.

20. In a numerically controlled machine, wherein:

a program profile is defined in terms of at least two perpendicular coordinate axes;

said profile is divided into program segments, each segment being defined by a mathematical expression, frequently different from the expression for the immediately adjacent segments;

the mathematical expression for each of said segments is converted into digital segment data and said digital segment data is programmed into computation and storage means, each of said profile segments being represented by one block of data;

a method of providing cutter tool size compensation in said numerically controlled system comprising of steps of:

defining an axes offset for said cutter tool satisfying the equation:

$A^2 + B^2 - r^2 = 0$ wherein A is the axes offset along one of said two perpendicular coordinate axes and B is the axes offset along the other coordinate axes and $r$ is the radius of the cutting tool wherein the solution of the equation $A^2 + B^2 - r^2 = 0$ further satisfying the relationship:

$A/B = -\Delta Y/\Delta X$ where $\Delta X$ is the mathematical expression representative of the digital segment data along said one coordinate axes and $\Delta Y$ is the mathematical expression representative of the digital segment data along said other coordinate axes;

providing an offset algorithmm for each of said axes offsets, said algorithm being expressed in terms of pulse rates $\Delta A$, $\Delta B$ and $\Delta r$ wherein pulse rate $\Delta A$ is proportional to the mathematical expression $\Delta Y$, pulse rate $\Delta B$ proportional to the mathematical expression $\Delta X$ and pulse rate $\Delta r$ proportional to the cutter radius $r$, and, providing an algorithm for converting said $\Delta A$ and $\Delta B$ pulse rates into axes offsets A and B respectively;

providing storage and computation circuitry for generating $\Delta A$,, $\Delta B$ and $\Delta r$ pulse rates, satisfying the equations:

$\Delta A^2 + \Delta B^2 - \Delta r^2 = 0$ and $\Delta A/\Delta B = -\Delta Y/\Delta X$ and for converting said pulse rates $\Delta A$ and $\Delta B$ to offsets A and B respectively, satisfying the equations:

$A^2 + B^2 - r^2 = 0$ and $A/B = -\Delta V/\Delta X$ and;

initiating said cutter tool compensation by injecting information relating to the radius of the cutter to be used and said digital segment data into said computation and storage means and allowing said electronic circuitry to calculate the required offset in accordance with said segment data, said information relating to the size of said tool and said offset algorithms.

21. In a numerically controlled machine, wherein:

a program profile having an assumed cutter tool radius is defined in terms of at least two perpendicular coordinate axes;

said profile is divided into program segments, each segment being defined by a mathematical expression, frequently different from the expression for the immediately adjacent segments;

the mathematical expression for each of said segments is converted into digital segment data and said digital segment data is programmed into computation and storage means, each of said profile segments being represented by one block of data;

a method of providing cutter tool size compensation in said numerically controlled system comprising the steps of:

defining an axes offset for said cutter tool, satisfying the equation:

$A^2 + B^2 - r^2 = 0$ wherein A is the axes offset along one of said two perpendicular coordinate axes and B is the axes offset along the other coordinate axes and $r$ is the difference between the radius of the actual cutting tool and radius of the assumed cutting tool, wherein the solution of the equation $A^2 + B^2 - r^2 = 0$ further satisfying the relationship:

$A/B = -\Delta Y/\Delta X$ where $\Delta X$ is the mathematical expression represented of the digital segment data along said one coordinate axes and $\Delta Y$ is the mathematical expression represented of the digital segment data along said other coordinate axes;

providing an offset algorithm for each of said axes offsets, said algorithm being expressed in terms of pulse rates, $\Delta A$, $\Delta B$ and $\Delta r$ wherein pulse rate $\Delta A$ is proportional to the mathematical expression $\Delta Y$, pulse rate $\Delta B$ is proportional to the mathematical expression $\Delta X$ and pulse rate $\Delta r$ proportional to the difference between the actual cutter radius and the assumed tool radius, and, providing an algorithm for converting said $\Delta A$ and $\Delta B$ pulse rates into axes offsets A and B respectively;

providing storage and computation circuitry for generating $\Delta A$, $\Delta B$ and $\Delta r$ pulse rates satisfying the equations:

$\Delta A^2 + \Delta B^2 - \Delta r^2 = 0$ and $\Delta A/\Delta B = -\Delta Y/\Delta X$ and for converting said pulse rates $\Delta A$ and $\Delta B$ to offsets A and B respectively satisfying the equations:

$A^2 + B^2 - r^2 + 0$ and $A/B = -\Delta Y/\Delta X$ and;

initiating said cutter tool compensation by injecting information relating to the radius of the cutter to be used and said digital segment data into said computation and storage means and allowing said electronic circuitry to calculate the required offset in accordance with said segment data, said information relating to the difference between the actual and assumed size of said tool, and said offset algorithms.

* * * * *